No. 796,315. PATENTED AUG. 1, 1905.
A. GARFEIN.
SPITTOON.
APPLICATION FILED JAN. 13, 1905.

2 SHEETS—SHEET 1.

WITNESSES:
Geo. P. Kingsbury
Redy Wooster

INVENTOR
Aron Garfein
BY
Munn
ATTORNEYS

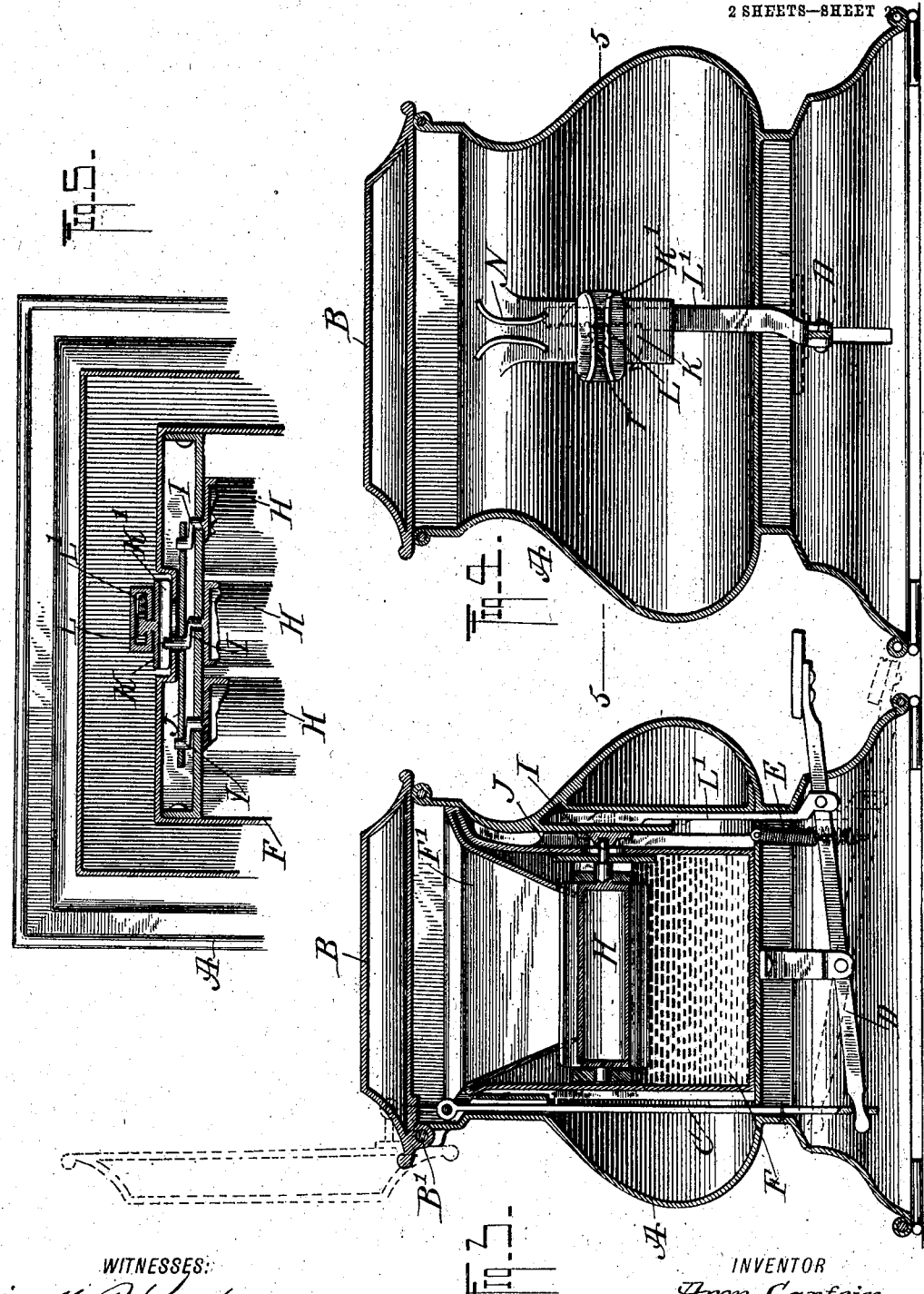

UNITED STATES PATENT OFFICE.

ARON GARFEIN, OF NEW YORK, N. Y.

SPITTOON.

No. 796,315.  Specification of Letters Patent.  Patented Aug. 1, 1905.

Application filed January 13, 1905. Serial No. 240,896.

*To all whom it may concern:*

Be it known that I, ARON GARFEIN, a subject of the Sultan of Turkey, residing in the city of New York, borough of Manhattan, in the county and State of New York, have invented a new and Improved Spittoon, of which the following is a full, clear, and exact description.

The object of the invention is to provide a new and improved spittoon which is sanitary, inoffensive to the eye, and arranged to completely conceal the accumulating sputum and to allow convenient cleaning whenever desired.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
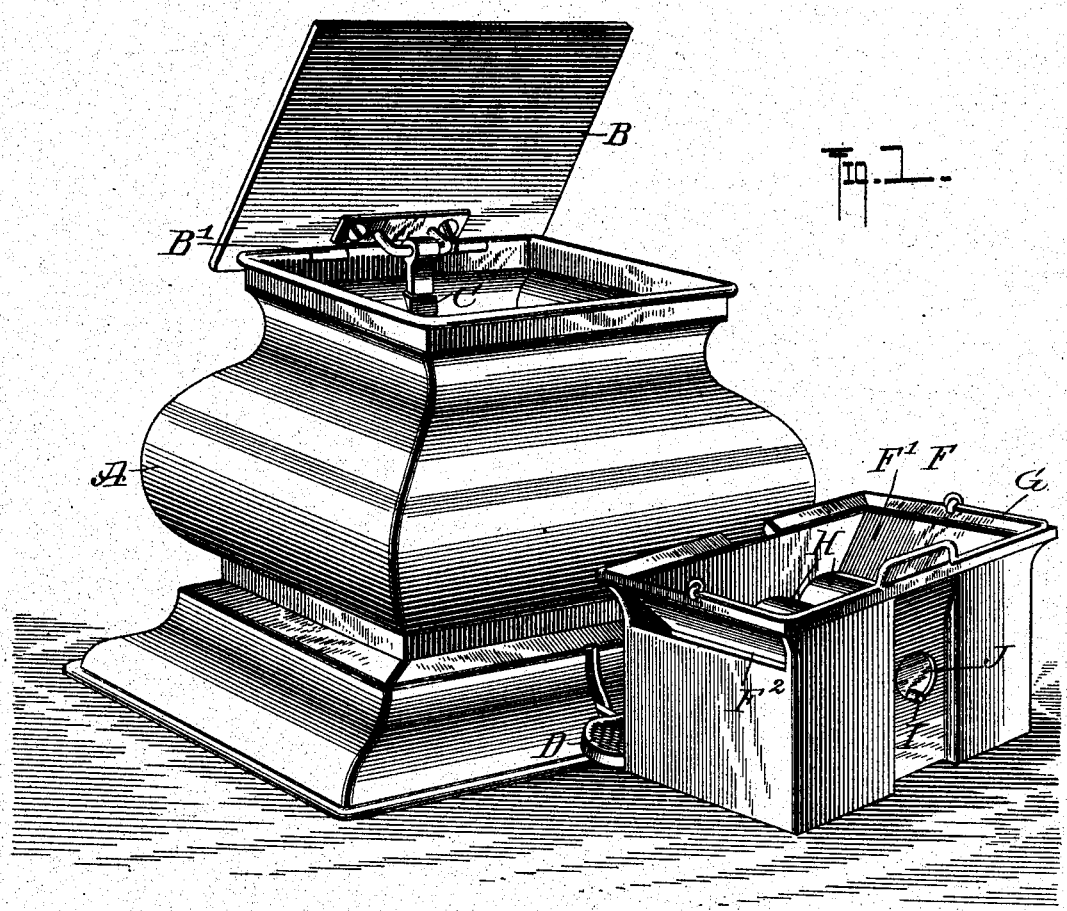
Figure 2:
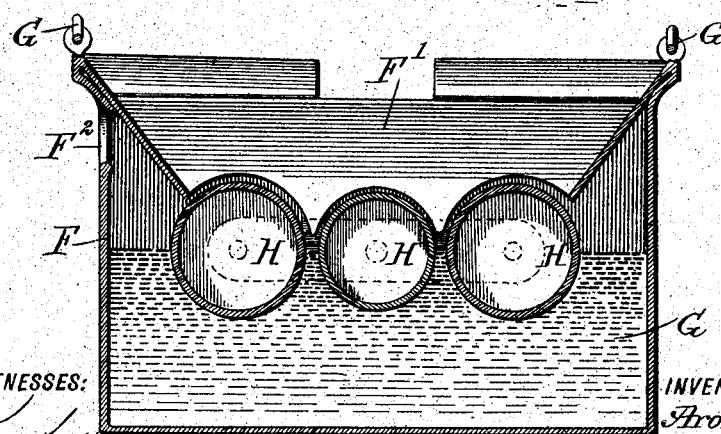

Figure 1 is a perspective view of the casing and the sputum-receiving receptacle disengaged from the casing. Fig. 2 is a sectional side elevation of the sputum-receiving receptacle. Fig. 3 is a transverse section of the improvement. Fig. 4 is a sectional rear side elevation of the casing; and Fig. 5 is a sectional plan view of the improvement on the line 5 5 of Fig. 4, showing the sputum-receiving receptacle in position in the casing.

The casing A, of a suitable ornamental appearance, is provided with a cover B, hinged at B' to the casing A at the rear side thereof, and the said cover B is pivotally connected by a link C with the rear end of a treadle D, fulcrumed in the lower portion of the casing A and extending to the front thereof, so as to be within convenient reach of the person desiring to use the spittoon. A spring E draws the treadle D so as to normally hold the front end thereof in an uppermost position and the cover B in a closed position. By a person pressing the front end of the treadle D a swinging motion is given to the same to cause the link C to swing the cover B into an open position, as indicated in dotted lines in Fig. 3, and when the person releases the treadle then the cover B immediately swings shut, partly by its own weight, but mainly, however, from the action of the spring E.

Into the casing A is removably set a sputum-receiving receptacle F, provided at its upper end with a suitable bail G for conveniently placing the receptacle F into the casing or removing it therefrom whenever it is desired to empty the sputum and the washing liquid with which the lower portion of the receptacle is filled. The receptacle F is provided in its upper end with a hopper-shaped top F', below which are arranged a plurality of transversely-extending rollers H, journaled in suitable bearings carried by the receptacle F, the lower portions of the said rollers extending into the washing liquid contained in the casing F.

The several rollers H are provided at their forward ends with crank-arms I, connected with each other by a connecting-rod J, (see Fig. 5,) and one of the crank-arms I, preferably that of the middle roller H, extends through an opening in the forward side of the receptacle F to engage a guideway K', formed on the rear face of a disk K, mounted to turn in suitable bearings on the inner face of the casing A, and on the said disk K is secured a pinion L, in mesh with a rack L', pivotally connected with the forward end of the treadle D, so that when the latter is successively pressed and released the rack L' is caused to slide up and down, thus rotating the pinion L forward and backward, and with it the disk K, so that the guideway K' thereof imparts a forward-and-backward rotary motion to the middle roller H, which by its connection with the cranks of the other rollers causes all the rollers to rotate in unison forward and backward.

In the construction shown the rollers each make about two full revolutions when the cover B is swung open and a like number of revolutions on the closing of the cover. When the treadle D is pressed and the cover B is in an open position, then the guideway K' stands approximately vertically, so that the operator in taking hold of the bail G can conveniently remove the receptacle F from the casing A to empty the receptacle of the washing liquid and the sputum washed off the rollers while rotating in the washing liquid.

In order to conveniently replace the receptacle F while the treadle D is pressed and the cover B is in an open position, a guideway N is provided on the inner face of the casing A to guide the projecting end of the crank-arm I for the middle roller H down into the guideway K' of the disk K. (See Fig. 4.) One end of the receptacle F is provided with a discharge-opening $F^2$ to permit of conveniently emptying the receptacle F, when removed from the casing A, of the washing liquid and the sputum contained therein.

When the receptacle F is in position in the casing A, the latter is normally closed, and when a person desires to use the spittoon it is only necessary for the person to press the treadle D, so that the cover B flies open to permit the person to expectorate into the receptacle F, the sputum passing to the rollers H. When the person releases the treadle D, the cover B automatically closes, as previously mentioned, so that the interior parts of the spittoon are concealed. As the rollers H are rotated both on pressing and releasing the treadle D, it is evident any sputum which passes onto the rollers H is washed off the same by the liquid contained in the casing F and with which the entire peripheral surfaces of the rollers come in contact when rotating the rollers as above described.

Having thus described my invention, I claim as new and desire to secure by Letters Patent—

1. A spittoon comprising a casing having a cover, a sputum-receiving receptacle in the said casing, arranged for containing a washing liquid, and rollers mounted to turn in the said receptacle for receiving the sputum and delivering it to the said washing liquid.

2. A spittoon comprising a casing having a cover, a sputum-receiving receptacle in the said casing, arranged for containing a washing liquid, rollers mounted to turn in the said receptacle for receiving the sputum and delivering it to the said washing liquid, and a manually-controlled mechanism for actuating the said rollers.

3. A spittoon comprising a casing having a hinged cover, a treadle mechanism connected with the said cover, to swing the latter into an open position, a sputum-receiving receptacle removably held in the said casing, and a plurality of rollers mounted to turn in the said receptacle for receiving and discharging the sputum, the said rollers being connected with and actuated from the said treadle mechanism.

4. A spittoon comprising a casing having a hinged cover, a treadle mechanism connected with the said cover, to swing the latter into an open position, a sputum-receiving receptacle removably held in the said casing and arranged for containing a washing liquid, rollers journaled in the said receptacle and extending with their lower portions into the said washing liquid, and means connecting the said rollers with the said treadle mechanism, to turn the rollers.

5. A spittoon provided with a sputum-receiving receptacle, a plurality of transversely-extending rollers mounted to turn in the said receptacle and adapted to receive the sputum and discharge it into the receptacle below the said rollers, and means for turning the rollers in unison.

6. A spittoon provided with a sputum-receiving receptacle for containing a washing liquid and having a hopper-shaped top, and rollers journaled in the said receptacle, below the said top and extending with their lower portions into the said washing liquid.

7. A spittoon provided with a sputum-receiving receptacle for containing a washing liquid and having a hopper-shaped top, rollers journaled in the said receptacle, below the said top and extending with their lower portions into the said washing liquid, and manually-controlled means for rotating the said rollers.

8. A spittoon provided with a sputum-receiving receptacle for containing a washing liquid and having a hopper-shaped top and a discharge-opening in one end, and rollers journaled in the said receptacle, below the said top and extending with their lower portions into the said washing liquid.

9. A spittoon provided with a sputum-receiving receptacle for containing a washing liquid and having a hopper-shaped top, rollers journaled in the said receptacle, below the said top and extending with their lower portions into the said washing liquid, and manually-controlled means for rotating the said rollers, comprising crank-arms on the rollers, a connecting-rod connecting the crank-arms with each other a crank-disk, having a guideway, engaged by one of the crank-arms, and a pinion and rack for turning the said crank-disk.

10. A spittoon provided with a sputum-receiving receptacle for containing a washing liquid and having a hopper-shaped top, rollers journaled in the said receptacle, below the said top and extending with their lower portions into the said washing liquid, and manually-controlled means for rotating the said rollers, comprising crank-arms on the rollers, a connecting-rod connecting the crank-arms with each other, a crank-disk, having a guideway, engaged by one of the crank-arms, a pinion and rack for turning the said crank-disk, and a spring-treadle connected with the said rack.

11. A spittoon provided with a sputum-receiving receptacle for containing a washing liquid and having a hopper-shaped top, rollers journaled in the said receptacle, below the said top and extending with their lower portions into the said washing liquid, and manually-controlled means for rotating the said rollers, comprising crank-arms on the rollers, a connecting-rod connecting the crank-arms with each other, a crank-disk, having a guideway, engaged by one of the crank-arms, a pinion and rack for turning the said crank-disk, and a fixed guideway for guiding the disk-engaging crank-arm to the said guideway on the disk.

12. A spittoon comprising a casing having a hinged cover, a treadle mechanism connected with the said cover to swing the latter into an open position, a sputum-receiving receptacle removably held in the said casing and arranged for containing a liquid, the said receptacle having a hopper-shaped top and a discharge-opening at one end, rotatable means located in the receptacle below the said top for receiving the sputum and delivering it to the liquid, a disk mounted to turn and connected with the said rotatable means to actuate the same and a connection between the treadle mechanism and said disk for rotating the latter.

13. A spittoon provided with a receptacle, movable sputum-receiving means located in said receptacle and adapted to receive the sputum and discharge it into the receptacle, a member mounted to turn and having a guideway, mechanism engaging said guideway and connected with the movable sputum-receiving means to actuate the latter when the member is turned, and means for rotating the said member.

14. A spittoon comprising a receptacle, arranged for containing a washing liquid, movable sputum-receiving means in the said receptacle for receiving the sputum and delivering it to the liquid, and mechanism for actuating the said movable means, the said mechanism including a member mounted to turn, means for turning the member, and means for detachably connecting the movable sputum-receiving means with said member.

15. A spittoon comprising a casing having a hinged cover a sputum-receiving receptacle removably held in the said casing and arranged for containing a liquid, movable means arranged in the receptacle for receiving the sputum and delivering it to the liquid, a disk having a guideway and mounted to turn on the inner face of the casing, means engaging said guideway and connected with the movable sputum-receiving means to actuate the latter when the disk is turned, a treadle mechanism connected with the cover of the casing to swing the latter into an open position, and a connection between the treadle mechanism and the said disk for rotating the latter.

In testimony whereof I have signed my name to this specification in the presence of two subscribing witnesses.

ARON GARFEIN.

Witnesses:
   THEO. G. HOSTER,
   EVERARD BOLTON MARSHALL.